United States Patent
Wu et al.

(10) Patent No.: US 9,017,853 B2
(45) Date of Patent: Apr. 28, 2015

(54) LITHIUM BATTERY AND ELECTRODE PLATE STRUCTURE

(75) Inventors: Ping-Yao Wu, Hsinchu County (TW); Wen-Bing Chu, Hsinchu (TW); Chang-Rung Yang, Hsinchu (TW); Jen-Jeh Lee, Taipei (TW); Jing-Pin Pan, Hsinchu County (TW); Tsung-Hsiung Wang, Taichung (TW); Yu-Min Peng, Hsinchu (TW)

(73) Assignee: Industrial Technololgy Research Institute, Hsinchu (TW)

( * ) Notice: Subject to any disclaimer, the term of this patent is extended or adjusted under 35 U.S.C. 154(b) by 526 days.

(21) Appl. No.: 13/214,241

(22) Filed: Aug. 22, 2011

(65) Prior Publication Data

US 2012/0164511 A1  Jun. 28, 2012

(30) Foreign Application Priority Data

Dec. 27, 2010  (TW) .............................. 99146137 A

(51) Int. Cl.
| | |
|---|---|
| *H01M 10/52* | (2006.01) |
| *H01M 2/16* | (2006.01) |
| *H01M 4/13* | (2010.01) |
| *H01M 10/052* | (2010.01) |

(52) U.S. Cl.
CPC .......... *H01M 10/052* (2013.01); *H01M 2/1646* (2013.01); *H01M 2/1653* (2013.01); *H01M 2/166* (2013.01); *H01M 4/13* (2013.01); *Y02E 60/122* (2013.01)

(58) Field of Classification Search
CPC . H01M 10/052; H01M 2/1646; H01M 2/166; H01M 4/13; Y02E 60/122
USPC ......... 429/144, 122, 129, 131, 161, 209, 247, 429/249, 251, 252; 29/623.1, 623.2, 623.3, 29/623.4, 623.5; 428/195.1, 209, 210
See application file for complete search history.

(56) References Cited

U.S. PATENT DOCUMENTS

| | | | | |
|---|---|---|---|---|
| 3,528,841 A | * | 9/1970 | Donaldson et al. | ........... 427/222 |
| 5,041,519 A | * | 8/1991 | Pan et al. | ....................... 528/114 |
| 7,695,854 B2 | | 4/2010 | Fujikawa et al. | |

(Continued)

FOREIGN PATENT DOCUMENTS

| | | | | |
|---|---|---|---|---|
| EP | 1768209 | | 3/2007 | |
| JP | H04-183771 | * | 6/1992 | ............. C09J 179/08 |

(Continued)

OTHER PUBLICATIONS

Iijima per Salamone ed Polymeric Materials Encyclopedia CRC Press 1996 Boca Raton FL p. 683.*

(Continued)

*Primary Examiner* — Patrick Ryan
*Assistant Examiner* — Aaron Greso
(74) *Attorney, Agent, or Firm* — Jianq Chyun IP Office

(57) ABSTRACT

A lithium battery is provided. The lithium battery comprises an positive electrode plate having a first surface, a negative electrode plate having a second surface, a first thermal insulating layer and a separator. The first surface is opposite to the second surface. The thermal insulating layer is disposed on one of the first surface and the second surface. The thermal insulating layer is comprised of an inorganic material, a thermal activation material and a binder. The separator is disposed between the positive electrode plate and the negative electrode plate.

24 Claims, 4 Drawing Sheets

(56) References Cited

U.S. PATENT DOCUMENTS

| | | | |
|---|---|---|---|
| 7,785,734 B2 | 8/2010 | Chang et al. | |
| 2003/0008205 A1* | 1/2003 | Horie et al. | 429/120 |
| 2007/0020525 A1 | 1/2007 | Kim et al. | |
| 2007/0281206 A1* | 12/2007 | Fujikawa et al. | 429/62 |
| 2008/0038631 A1 | 2/2008 | Nakura et al. | |
| 2008/0157021 A1* | 7/2008 | Wang et al. | 252/62.2 |
| 2009/0253043 A1 | 10/2009 | Bak | |
| 2010/0151326 A1 | 6/2010 | Jung et al. | |
| 2010/0159314 A1 | 6/2010 | Kim et al. | |

FOREIGN PATENT DOCUMENTS

| | | |
|---|---|---|
| JP | 2008-226566 | 9/2008 |
| JP | 2008210686 | 9/2008 |
| JP | 2008-234853 | 10/2008 |
| JP | 2010157512 | 7/2010 |
| TW | 201025697 | 7/2010 |
| WO | 2008062727 | 5/2008 |
| WO | 2008156033 | 12/2008 |
| WO | 2009066916 | 5/2009 |

OTHER PUBLICATIONS

Pan et al. Journal of Applied Polymer Sci vol. 45 pp. 103-109.*
Real Dictionary—Adhesive Princeton Univ Princeton NJ USA (C) 2001 available May 26, 2003.*
Real Dictionary—Film Princeton Univ Princeton NJ USA (c) 2001 available May 26, 2003.*
"Office Action of Taiwan Counterpart Application", issued on May 28, 2013, p. 1-p. 8.
"Office Action of Japan Counterpart Application", issued on Jul. 30, 2013, p. 1-p. 3.

* cited by examiner

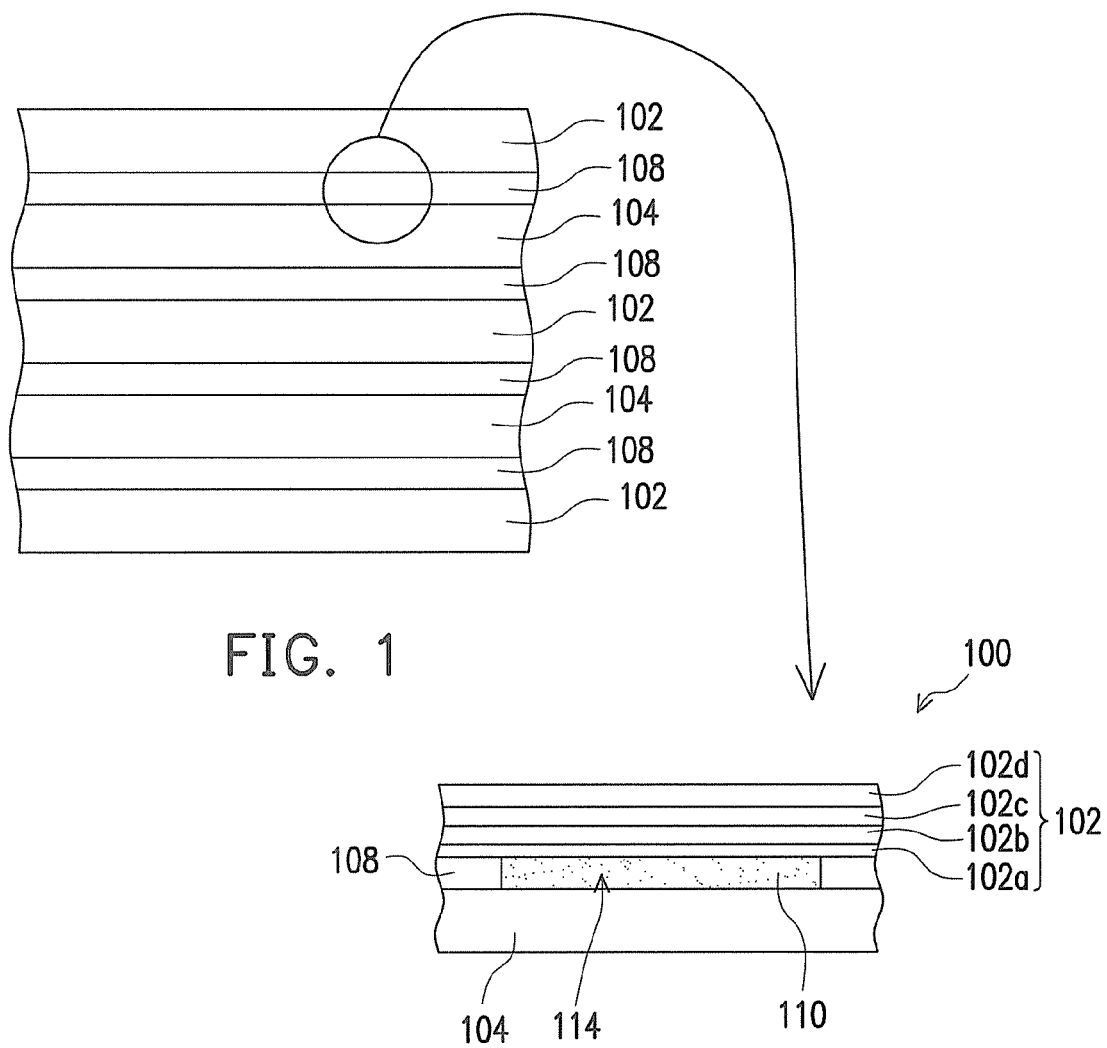

LITHIUM BATTERY AND ELECTRODE PLATE STRUCTURE

CROSS-REFERENCE TO RELATED APPLICATION

This application claims the priority benefit of Taiwan application serial no. 99146137, filed Dec. 27, 2010. The entirety of the above-mentioned patent application is hereby incorporated by reference herein and made a part of this specification.

BACKGROUND OF THE APPLICATION

1. Field of the Invention

The application relates to a battery, and particularly to a lithium battery.

2. Description of Related Art

Since one-time used battery does not full fill the requirement of the environmental protection, the battery system capable of being recharged is getting a lot of interests. With the rapid development and popularization of the portable electronic products, the lithium batteries which can repeat the cycle of discharging-and-recharging have the advantages of light weight, high voltage and high energy density so that the market demands on the lithium batteries increase. Comparing with the nickel-metal-hydride battery, the nickel-zinc battery and the nickel-cadmium battery, the lithium battery has the advantages of high working voltage, large energy density, light weight, long lifetime and good environmental protection and the lithium battery is one of the best batteries for being applied in the flexible battery in the future.

The lithium batteries are widely used in the so-called 3C products including computers (i.e. the information products), the communication products and the consumer electronics so that the demands on the performance of the lithium batteries, such as light weight, durability, high voltage, high energy density and safety, become high. Further, the developmental potential and the application of the lithium batteries in the light-weighted electromobile industry, electric motor car industry and large-sized electronic storage industry are high. However, the organic solvents (most of these organic solvents include the organic molecules having ester groups) with high-voltage endurance which is used in the lithium battery system is flammable. Also, the positive electrode/negative electrode activity substance with high capacitance would decompose to generate a great amount of heat while the temperature of the battery increases so that the heat generated while the lithium battery is not properly used can ignite the organic solvent and even lead to the explosion. Moreover, during the discharge process of the lithium battery, since the oxygen is expelled from the positive electrode material structure, the expelled oxygen reacts with the electrolyte, which leads to the increasing of the internal temperature and induces safety problem of the lithium battery.

SUMMARY OF THE INVENTION

The application provides a lithium battery capable of decreasing the conductivity while the temperature of the lithium battery increases.

The application provides a electrode plate structure capable of enhancing the safety for using the lithium battery.

The application provides a lithium battery comprising a positive electrode plate, a negative electrode plate, a first thermal insulating layer and a separator. The positive electrode plate has a first surface. The negative electrode plate has a second surface and the second surface is opposite to the first surface of the positive electrode plate. The first thermal insulating layer is located on one of the first surface and the second surface, wherein the first thermal insulating layer is comprised of an inorganic material, a thermal activation material and a binder. The separator is located between the positive electrode plate and the negative electrode plate.

The application further provides an electrode plate structure comprising an electrode plate and a thermal insulating layer. The electrode plate has a charging-discharging surface. The thermal insulating layer is located on the charging-discharging surface, wherein the thermal insulating layer is comprised of an inorganic material, a thermal activation material and a binder.

In order to make the aforementioned features and advantages of the application more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic cross-sectional view of a portion of a lithium battery according to one embodiment of the present application.

FIG. 1A is a partial enlargement view of the cross-section of the lithium battery shown FIG. 1.

DESCRIPTION OF EMBODIMENTS

Figure 1B:
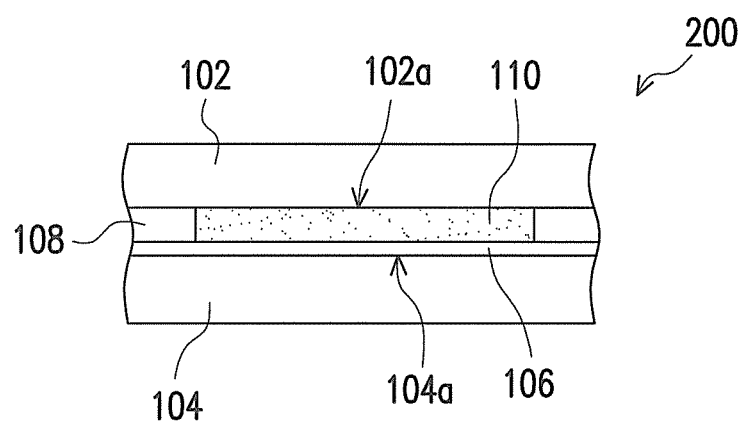
FIG. 1B is a partial enlargement view of a cross-section of a lithium battery according to another embodiment of the present application.

FIG. 1 is a schematic cross-sectional view of a portion of a lithium battery according to one embodiment of the present application. As shown in FIG. 1, a lithium battery 100 of the present embodiment comprises several positive electrode plates 102, several negative electrode plates 104, several separators 108 and an electrolyte 110. The positive electrode plates 102 and the negative electrode plates 104 are alternatively arranged and are stacked on one another. Further, for a pair of one positive electrode plate 102 and one negative electrode plate 104, there is one separator 108 disposed between the positive electrode plate 102 and the negative electrode plate 104. Each of the separators 108 can be formed of, for example but not limited to, a porous structure and the porosity of the porous structure is about 40~55%. Moreover, the holes of the porous structure uniformly distribute in the whole separator 108. The positive electrode plates 102, the separators 108, the negative electrode plates 104 which are stacked on one another are soaked in the electrolyte 110. On other words, the whole body of the battery is flood with the electrolyte 110.

The material of the positive electrode plates 102 includes lithium mixed metal oxide, such as one selected from a group comprised of $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M=transition metal), $LiMn_{0.5}Ni_{0.5}O_2$, $LiNi_xCo_yMn_zO_2$ (x+y+z=1), $LiNi_xCo_yAl_zO_2$ (x+y+z=1), $LiMc_{0.5}Mn_{1.5}O_4$ and the combination thereof, wherein Mc is divalent metal.

The material of the negative electrode plates includes carbide and lithium alloy. The carbide can be selected from a group comprised of carbon powder, graphite, carbon fiber, carbon nanotubes and the combination thereof. In one embodiment of the present application, the carbide is carbon powder and the particle diameter of the carbon powder is about 1~30 microns. In another embodiment, the material of the negative electrode plates 104 includes metal, such as LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$ and the combination thereof. Moreover, In another embodiment, the negative electrode plates 104 include metal-containing oxide, such as SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, $TiO_2$, $Li_3Ti_5O_{12}$ or the combination thereof.

FIG. 1A is a partial enlargement view of the cross-section of the lithium battery shown FIG. 1. More specifically, as shown in FIG. 1A, the lithium battery of the present embodiment further comprises a first thermal insulating layer 106. That is, the positive electrode plate 102 is disposed to be opposite to the negative electrode plate 104 and the positive electrode plate 102 has a first surface 102a opposite to the negative electrode plate 104 and the negative electrode plate 104 has a second surface 104a opposite to the positive electrode plate 102. On other words, the second surface 104a is opposite to the first surface 102a of the positive electrode plate 102. Each of the first surface 102a and the second surface 104a is a charging-discharging surface of the electrode plate which the lithium ions diffuse into or out during the charging process and discharging process of the lithium battery.

The first thermal insulating layer 106 is located on one of the first surface 102a and the second surface 104a. The thickness of the first thermal insulating layer 106 is about 0.1~20 microns. In the present embodiment, the first thermal insulating layer 106 is located on the first surface 102a of the positive electrode plate 102. However, the aforementioned arrangement does not limit the scope of the present application. As shown in FIG. 1B, a partial enlargement view of a cross-section of a lithium battery 200 according to another embodiment of the present application, the first thermal insulating layer 106 is disposed on the negative electrode plate 104. That is, the first thermal insulating layer 106 can be disposed on either the first surface 102a or the second surface 104a.

Figure 1C:
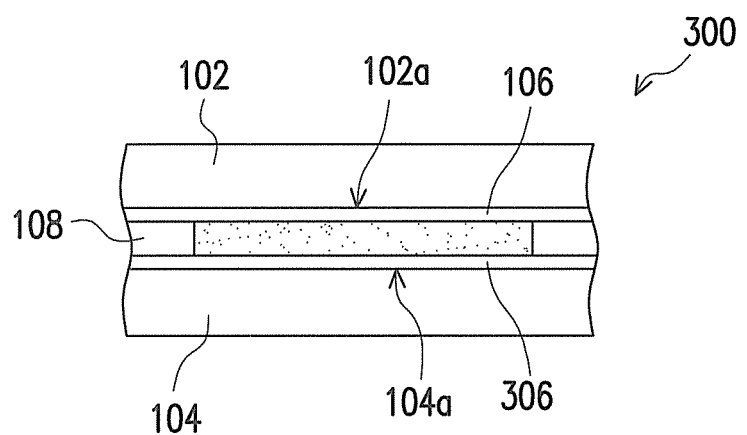
FIG. 1C is a partial enlargement view of a cross-section of a lithium battery according to the other embodiment of the present application.

Moreover, FIG. 1C is a partial enlargement view of a cross-section of a lithium battery according to the other embodiment of the present application. As shown in FIG. 1C, the lithium battery 300 of the present embodiment further comprises a second thermal insulating layer 306. The material of the second thermal insulating layer 306 is as same as the material of the first thermal insulating layer 106. That is, the first thermal insulating layer 106 and the second thermal insulating layer 306 are disposed on the first surface 102a of the positive electrode plate 102 and the second surface 104a of the negative electrode plate 104 respectively. The thickness of the second thermal insulating layer 306 is about 0.1~20 microns. In another embodiment (not shown), the first thermal insulating layer 106 is located at the second surface 104a of the negative electrode plate 104 and the second thermal insulating layer 306 is located at the first surface 102a of the positive electrode plate 102. That is, for the charging-discharging surface of each of the positive electrode plate 102 and the negative electrode plate 104, there is a layer of thermal insulating layer coated thereon.

Figure 2:
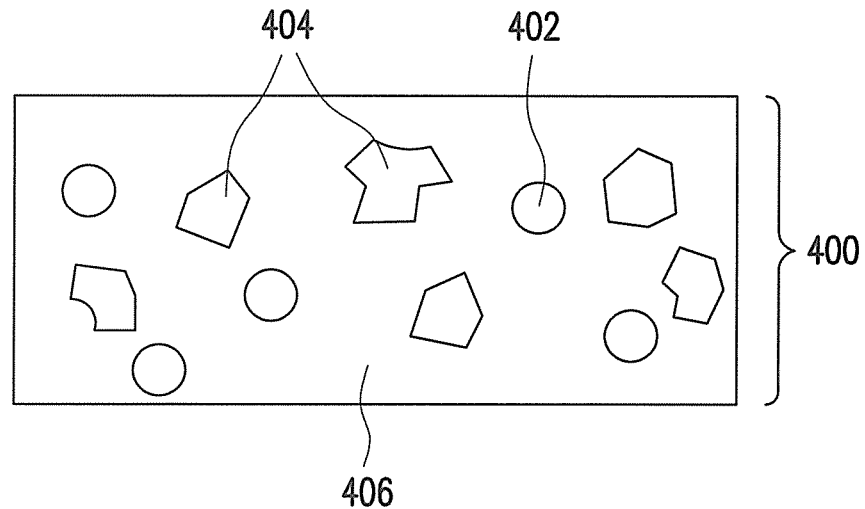
FIG. 2 is a schematic cross-sectional view showing a thermal insulating layer in a lithium battery according to one embodiment of the present application.

FIG. 2 is a schematic cross-sectional view showing a thermal insulating layer in a lithium battery according to one embodiment of the present application. As shown in FIG. 2, the thermal insulating layer 400 is comprised of, for example, an inorganic material 402, a thermal activation material 404 and a binder 406. The inorganic material 402 includes Al, Mg, Si, Zr, Ti, Zn, Li, Co or oxide thereof, hydroxide thereof, sulfide thereof, nitride thereof, halide thereof or the combination thereof. Preferably, the inorganic material includes silicon oxide ($SiO_2$), aluminum oxide ($Al_2O_3$), zirconium oxide ($ZrO_2$), magnesium oxide (MgO), titanium oxide ($TiO_2$), lithium titanium oxide ($LiTiO_2$) or zeolite. The binder 406 includes polyvinylidene fluoride (PVdF), styrene-butadiene rubber (SBR), polyamide, melamine resin or the combination thereof.

Moreover, the thermal activation material 404 includes a nitrogen-containing polymer. It should be noticed that the nitrogen-containing polymer includes the nitrogen-containing compound with the number average molecular weight at least 1500 or the nitrogen-containing oligomer with the number average molecular weight about 200~2999. In one embodiment, the thermal activation material 404 includes the nitrogen-containing polymer which can be the hyper branched polymers formed by the reaction between diones and one selected from a group comprising amines, amides, imides, maleimides and imines. More specifically, the diones includes barbituric acid, derivatives of barbituric acid, acetylactone or derivatives of acetylactone. In another embodiment, the thermal activation material 404 includes the nitrogen-containing polymer which can be formed by, for example, the reaction between the bismaleimide and the barbituric acid.

The chemical structure of the aforementioned amine is shown as following:

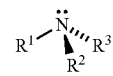

Wherein, $R^1$, $R^2$ and $R^3$ can be as same as or different from each other; each of $R^1$, $R^2$ and $R^3$ can be hydrogen, aliphatic group or aromatic group. More specifically, the amine can be the primary amine in which $R^2$ and $R^3$ are both hydrogen. In one embodiment, the aforementioned amines include 1,1'-bis (methoxycarbonyl)divinylamine (BDA), N-methyl-N,N-divinylamine or divinylphenylamine.

The chemical structure of the aforementioned amide is shown as following:

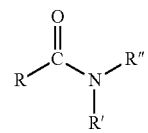

Wherein, R, R' and R" can be as same as or different from each other; each of R, R' and R" can be hydrogen, aliphatic group or aromatic group. More specifically, the amide can be the primary amide in which R' and R" are both hydrogen. In one embodiment, the aforementioned amides include N-Vinylamide, divinylamide, Silyl(vinyl)amides or glyoxylated-vinyl amide.

The chemical structure of the aforementioned imide is shown as following:

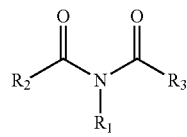

Wherein, $R_1$, $R_2$ and $R_3$ can be as same as or different from each other; each of $R_1$, $R_2$ and $R_3$ can be hydrogen, aliphatic group or aromatic group. In one embodiment, the aforementioned imides include divinylimide such as N-Vinylimide, N-Vinylphthalimide and vinylacetamide.

The maleimides includes monomaleimide, bis-maleimide, tris-maleimide and polymaleimide. The monomer of the aforementioned bis-maleimide comprises chemical structure (I) and chemical structure (II) shown as followings:

chemical structure (I)

chemical structure (II)

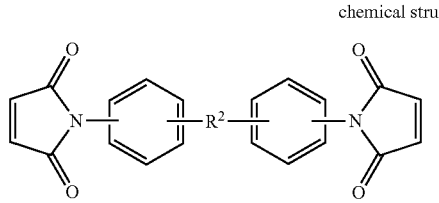

Wherein $R^1$ can be —$RCH_2R$—, —$RNH_2R$—, —C(O) $CH_2$—, —$CH_2OCH_2$—, —C(O)—, —O—, —O—O—, —S—, —S—S—, —S(O)—, —$CH_2S(O)CH_2$—, —(O)S (O)—, —$C_6H_4$—, —$CH_2(C_6H_4)CH_2$—, —$CH_2(C_6H_4)$ (O)—, phenylene, biphenylenyl, substituted phenylene or substituted biphenylenyl; $R^2$ can be —$RCH_2$—, —C(O)—, —$C(CH_3)_2$—, —O—, —O—O—, —S—, —S—S—, —(O) S(O)— or —S(O)—, wherein R is $C_1$-$C_6$ alkyl group. Bis-maleimide includes N,N'-bismaleimide-4,4'-diphenyl-methane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid and 4,4'-bis (maleimido)-diphenylsulfone.

The chemical structure of the aforementioned imine is shown as following:

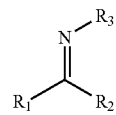

Wherein, $R_1$, $R_2$ and $R_3$ can be as same as or different from each other; each of $R_1$, $R_2$ and $R_3$ can be hydrogen, aliphatic group or aromatic group. The aforementioned imines include divinylimine or allylic imine.

The chemical structures of the barbituric acid and derivatives of barbituric acid are shown as following:

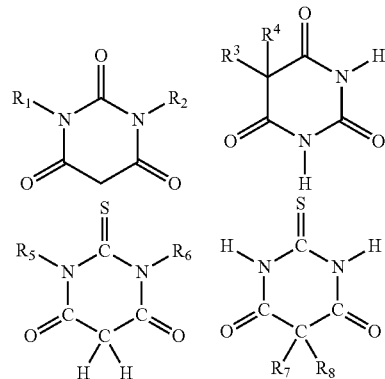

Wherein, $R^1$, $R^2$, $R^3$, $R^4$, $R^5$, $R^6$, $R^7$ and $R^8$ can be as same as or different from each other; each of $R^1$, $R^2$, $R^3$, $R^4$, $R^5$, $R^6$, $R^7$ and $R^8$ can be H, $CH_3$, $C_2H_5$, $C_6H_5$, $CH(CH_3)_2$, $CH_2CH$ $(CH_3)_2$, $CH_2CH_2CH(CH_3)_2$ or,

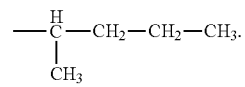

Wherein, while the compound is the barbituric acid, $R^1$, $R^2$, $R^3$ and $R^4$ are all hydrogen.

The chemical structures of the acetylactone and derivatives of acetylactone are shown as following:

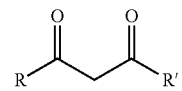

Wherein, each of R and R' can be aliphatic group, aromatic group or heterocyclic group. Also, while both of R and R' are methyl groups, the compound is acetylactone.

The mole ratio of the required amount of diones to the monomer of amines, amides, imides, maleimides or imines is about 1:20~4:1. Preferably, the mole ratio is about 1:5~2:1. More preferably, the mole ratio is about 1:3~1:1.

It should be noticed that the thermal activation material 404 is micromolecule material which uniformly distributes in the binder 406 before the thermal activation. Therefore, the diffusion of the lithium ions in the lithium battery does not affected by the thermal activation material 404. Once the temperature of the lithium battery increases, a cross-linking reaction of the thermal activation material 404 is initiated and the thermal activation material 404 is converted into the polymer so that the diffusion of the lithium ions is retarded and the conductivity of the electrolyte decreases. On other words, when the temperature of the lithium battery increases, the terminal groups of the thermal activation material 404 perform the cross-linking reaction to block the diffusion of the lithium ions. The temperature of the cross-linking reaction of the thermal activation material 404 is the onset temperature. For instance, when the nitrogen-containing polymer is formed by the reaction between bismaleimide and barbituric acid, the terminal groups of the thermal activation material 404 comprises ethenyl group (from bismaleimide) and amino group (from barbituric acid). When the temperature of the battery increases, the temperature of the cross-linking reaction of the ethenyl group with the amino group is the thermal activation temperature. In the present application, the thermal activation temperature is about 80~280° C. Preferably, the thermal activation temperature is about 100~220° C. More preferably, the thermal activation temperature is about 130~200° C.

Table 1 shows the conductivities of the electrolytes before and after the thermal activation of the thermal activation material on the electrode plate initiates.

TABLE 1

| Temperature(centigrade) | | 20 | 40 | 60 | 80 | 100 |
|---|---|---|---|---|---|---|
| conductivity (mS/cm) | Before | 3.8 | 7 | 10.9 | 14 | 17 |
| | After | 0.25 | 1.4 | 2.9 | 4.3 | 6.2 |

As shown in Table 1, the weight percentage of the thermal activation material in the thermal insulating layer is about 10 wt % and the thermal activation material is the nitrogen-containing polymer formed by the reaction between bismaleimide and barbituric acid. The ratio of ethenyl group (from bismaleimide) to amino group (from barbituric acid) is about 2 to 1. It should be noticed that, before the thermal activation of the thermal activation material initiates, the conductivity of the electrolyte of the lithium battery increases with the increasing of the temperature. However, after the thermal activation of the thermal activation material initiates, the conductivity of the electrolyte of the lithium battery decreases. Apparently, under the circumstance that a thermal insulating layer comprising the thermal activation material is disposed on the electrode plate of the lithium battery, the conductivity of the electrolyte can be effectively decreased after the thermal activation of the thermal activation material initiates.

As shown in FIG. 2, the inorganic material 402 and the thermal activation material 404 respectively in forms of a plurality of particles distribute in the binder 406. The weight percentage of the thermal activation material 404 in the thermal insulating layer 400 is about 0.1~40 wt %. Preferably, the weight percentage of the thermal activation material 404 in the thermal insulating layer 400 is about 1~30 wt % or 2~15 wt %. In the present embodiment, the particle of the inorganic material 402 is in round shape. However, the present application is not limited thereto. That is, the present application is not limited to that the inorganic material 402 is in a single particle form distributing in the binder 406 and that the shape of the particle of the inorganic material is round as shown in FIG. 2. On the other words, the particle of the inorganic material 402 can be in any shape, the inorganic material 402 distributing in the binder can be in single particle form or in cluster form which includes a plurality of particle of inorganic material. Similarly, as shown in FIG. 2, the particle of thermal activation material 404 is in polygon shape. However, the application is not limited thereto. That is, the application is not limited to that the thermal activation material 404 is in a single particle form distributing in the binder 406 and that the shape of the particle of the thermal activation material is polygon as shown in FIG. 2. On the other words, the particle of the thermal activation material 404 can be in any shape, the thermal activation material 404 distributing in the binder can be in single particle form or in cluster form which includes a plurality of particle of thermal activation material 404.

Figure 3:
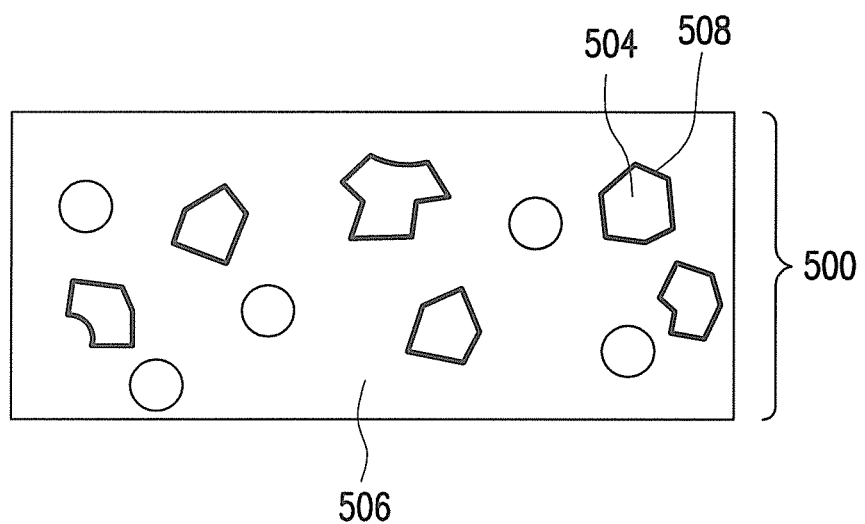
FIG. 3 is a schematic cross-sectional view showing a thermal insulating layer in a lithium battery according to another embodiment of the present application.

FIG. 3 is a schematic cross-sectional view showing a thermal insulating layer in a lithium battery according to another embodiment of the present application. As shown in FIG. 3, in another embodiment, the surface of each particle of the thermal activation material 504 in the thermal insulating layer 500 has a polymer thin film 508 coated thereon. That is, the polymer thin film 508 completely encloses each particle of the thermal activation material 504 distributing in the binder 506. The material of the polymer thin film 508 includes polyolefine or polyethylene. In the present embodiment, when the temperature of the lithium battery increases, the polymer thin film 508 cracks due to the heat and the thermal activation material 504 enclosed by the polymer thin film 508 is released. Thus, the cross-linking reaction of the terminal groups of the released thermal activation material 504 initiates and the diffusion of the lithium ions is blocked.

Then, as shown in FIG. 1A, the separator 108 of the lithium battery 100 is located between the positive electrode plate 102 and the negative electrode plate 104. It should be noticed that the positive electrode plate 102, the negative electrode plate 104, the thermal insulating layer 106 and the separator 108 are soaked in the electrolyte 110. That is, the space between the positive electrode plate 102, the negative electrode plate 104, the thermal insulating layer 106 and the separator 108 are flooded with the electrolyte 110. More specifically, the holes 114 of the separator 108 are flooded with the electrolyte 110. The separator 108 includes insulating material such as polyethylene (PE), polypropylene (PP), Teflon film, polyamide film, polyvinyl chloride film, polyvinylidene fluoride film, polyaniline film, polyimide film, nonwoven fabric, polyethylene terephthalate, polystyrene (PS), cellulose or the multi-layered complex structure thereof such as PE/PP/PE. The main composition of the electrolyte 110 includes organic solvent, lithium salt and additive. The organic solvent can be, for example, γ-butyrolactone (GBL), ethylene carbonate (EC), propylene carbonate (PC), diethyl carbonate (DEC), propyl acetate (PA), dimethyl carbonate (DMC), ethylmethyl carbonate (EMC) or the combination thereof. The lithium salt can be, for example, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, $LiB(C_2O_4)_2$ or the combination thereof.

Figure 4:
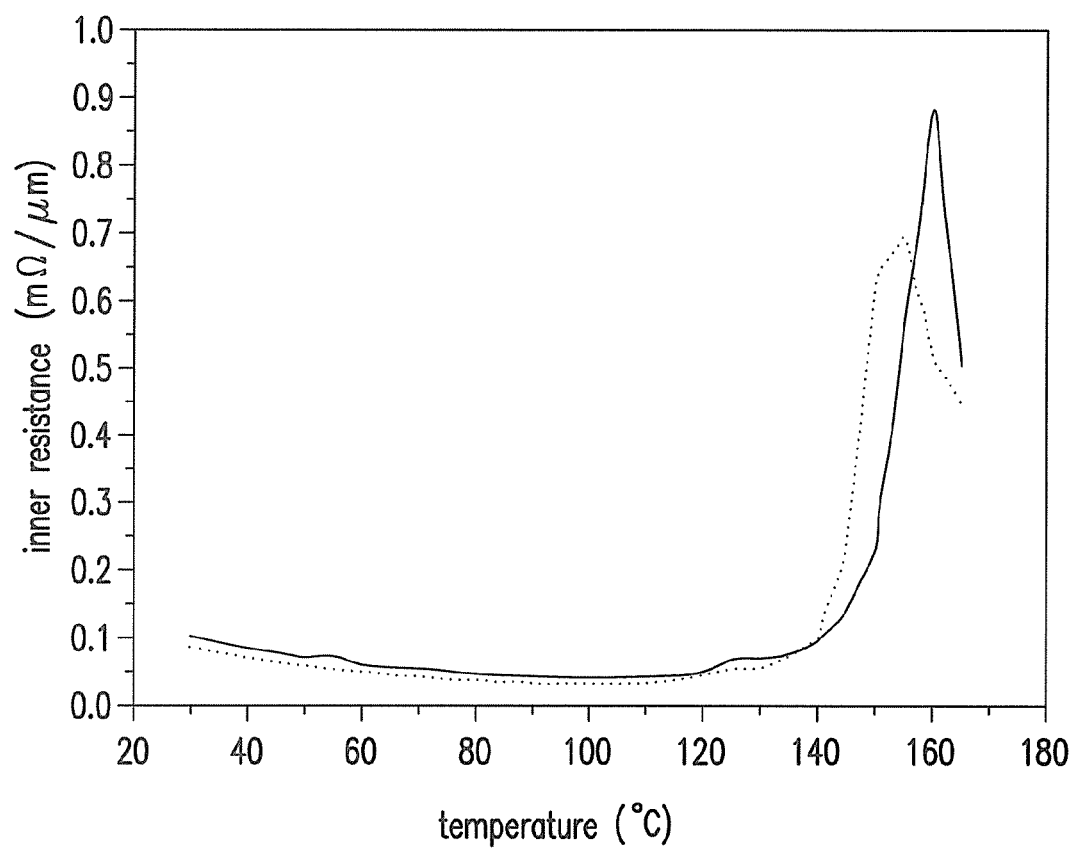
FIG. 4 is a plot diagram showing the inner resistance varied with the change of the temperature.

FIG. 4 is a plot diagram showing the inner resistance varied with the change of the temperature. As shown in FIG. 4, the variation of the inner resistance with the change of the temperature is measured while the lithium battery is heated up. The dotted curve represents the variation of the inner resistance when an aluminum oxide layer is coated on the positive electrode plate of the lithium battery and the solid curve represents the variation of the inner resistance when an aluminum oxide layer containing 3% thermal activation material is coated on the positive electrode plate of the lithium battery. According to the curves shown in FIG. 4, the increasing amount of the inner resistance of the positive electrode plate having the thermal activation material coated thereon is larger than the increasing amount of the inner resistance of the positive electrode plate without any thermal activation material thereon. Apparently, the thermal activation material effectively blocks the diffusion of the lithium ions.

In the present application, the thermal insulating layer is disposed on one of or both of the positive electrode plate and the negative electrode plate. Since the thermal insulating layer comprises the inorganic material capable of increasing the hardness and the thermal activation material capable of initiating the thermal activation while the temperature of the lithium battery increases, the cross-linking reaction of the thermal activation material initiates and the thermal activation material is converted into the polymer. Thus, the diffusion of the lithium ions is blocked by the polymer and the conductivity of the electrolyte decreased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A lithium battery, comprising:
   a positive electrode plate, wherein the positive electrode plate has a first surface;
   a negative electrode plate, wherein the negative electrode plate has a second surface and the second surface is opposite to the first surface of the positive electrode plate;
   a first thermal insulating layer located on one of the first surface and the second surface, wherein the first thermal insulating layer is comprised of an inorganic material, a thermal activation material and a binder, wherein the thermal activation material in forms of a plurality of particles distributes in the binder and a surface of each of the plurality of particles of the thermal activation material has a polymer thin film coated thereon,
   wherein while a temperature of the lithium battery increases to a first temperature, the polymer thin film cracks and the thermal activation material enclosed by the polymer thin film is released and a cross-linking reaction of the thermal activation material initiates and the thermal activation material is converted into a polymer so that a diffusion of the lithium ions is blocked by the polymer and the conductivity of the electrolyte decreased; and
   a separator located between the positive electrode plate and the negative electrode plate.

2. The lithium battery of claim 1, further comprising a second thermal insulating layer, wherein when the first thermal insulating layer is located on the first surface, the second thermal insulating layer is located on the second surface; when the first thermal insulating layer is located on the second surface, the second thermal insulating layer is located on the first surface.

3. The lithium battery of claim 2, wherein a material of the second thermal insulating layer is as same as a material of the first thermal insulating layer.

4. The lithium battery of claim 2, wherein a thickness of the second thermal insulating layer is about 0.1~20 microns.

5. The lithium battery of claim 1, wherein the inorganic material is selected from the group consisting of Al, Mg, Si, Zr, Ti, Zn, Li, Co, an oxide thereof, a hydroxide thereof, a sulfide thereof, a nitride thereof, a halide thereof and the combination thereof.

6. The lithium battery of claim 1, wherein the thermal activation material includes a nitrogen-containing polymer.

7. The lithium battery of claim 6, wherein the nitrogen-containing polymer is formed by a reaction between bismaleimide monomers and barbituric acid.

8. The lithium battery of claim 6, wherein the nitrogen-containing polymer is formed by a reaction between diones and one selected from a group comprising amines, amides, imides, maleimides and imines.

9. The lithium battery of claim 8, wherein the diones includes barbituric acid, derivatives of barbituric acid, acetylactone or derivatives of acetylactone.

10. The lithium battery of claim 1, wherein the inorganic material and the thermal activation material respectively in forms of a plurality of particles distribute in the binder.

11. The lithium battery of claim 1, wherein the polymer thin film is made of polyolefine or polyethylene.

12. The lithium battery of claim 1, wherein a weight percentage of the thermal activation material in the first thermal insulating layer is about 0.1~40 wt %.

13. The lithium battery of claim 1, wherein a thickness of the thermal insulating layer is about 0.1~20 microns.

14. An electrode plate structure, comprising:
    an electrode plate, wherein the electrode plate has a charging-discharging surface; and
    a thermal insulating layer located on the charging-discharging surface, wherein the thermal insulating layer is comprised of an inorganic material, a thermal activation material and a binder, wherein the thermal activation material in forms of a plurality of particles distributes in the binder and a surface of each of the plurality of particles of the thermal activation material has a polymer thin film coated thereon,
    wherein while a temperature of the lithium battery increases to a first temperature, the polymer thin film cracks and the thermal activation material enclosed by the polymer thin film is released and a cross-linking reaction of the thermal activation material initiates and the thermal activation material is converted into a polymer so that a diffusion of the lithium ions is blocked by the polymer and the conductivity of the electrolyte decreased.

15. The electrode plate structure of claim 14, wherein the electrode plate includes a positive electrode plate or a negative electrode plate.

16. The electrode plate structure of claim 14, wherein a thickness of the thermal insulating layer is about 0.1~20 microns.

17. The electrode plate structure of claim 14, wherein the inorganic material is selected from the group consisting of Al, Mg, Si, Zr, Ti, Zn, Li, Co, an oxide thereof, a hydroxide thereof, a sulfide thereof, a nitride thereof, a halide thereof and the combination thereof.

18. The electrode plate structure of claim 14, wherein the thermal activation material includes a nitrogen-containing polymer.

19. The electrode plate structure of claim 18, wherein the nitrogen-containing polymer is formed by a reaction between bismaleimide monomers and barbituric acid.

20. The electrode plate structure of claim 18, wherein the nitrogen-containing polymer is formed by a reaction between diones and one selected from a group comprising amines, amides, imides, maleimides and imines.

21. The electrode plate structure of claim 20, wherein the diones includes barbituric acid, derivatives of barbituric acid, acetylactone or derivatives of acetylactone.

22. The electrode plate structure of claim 14, wherein the inorganic material and the thermal activation material respectively in forms of a plurality of particles distribute in the binder.

23. The electrode plate structure of claim 14, wherein the polymer thin film is made of polyolefine or polyethylene.

24. The electrode plate structure of claim 14, wherein a weight percentage of the thermal activation material in the first thermal insulating layer is about 0.1~40 wt %.

* * * * *